(12) United States Patent
Ledbetter

(10) Patent No.: US 8,151,452 B2
(45) Date of Patent: Apr. 10, 2012

(54) PORTABLE ELECTRICAL EQUIPMENT RACKING TOOL

(76) Inventor: Finley Lee Ledbetter, Argyle, TX (US)

(*) Notice: Subject to any disclaimer, the term of this patent is extended or adjusted under 35 U.S.C. 154(b) by 372 days.

(21) Appl. No.: 12/500,523

(22) Filed: Jul. 9, 2009

(65) Prior Publication Data

US 2010/0024191 A1 Feb. 4, 2010

Related U.S. Application Data

(60) Provisional application No. 61/084,897, filed on Jul. 30, 2008.

(51) Int. Cl.
*B23P 19/00* (2006.01)

(52) U.S. Cl. .............. 29/756; 200/50.21; 200/50.24; 200/50.26

(58) Field of Classification Search ............ 29/756, 29/428, 622, 876; 200/50.21, 50.24, 50.26, 200/200, 296
See application file for complete search history.

(56) References Cited

U.S. PATENT DOCUMENTS

| | | | |
|---|---|---|---|
| 5,477,017 A | 12/1995 | Swindler et al. | |
| 6,777,627 B1 | 8/2004 | Stevenson | |
| 6,897,388 B2 | 5/2005 | Greer | |
| 6,951,990 B1 | 10/2005 | Miller | |
| 7,019,230 B1 | 3/2006 | Vaill et al. | |
| 7,825,344 B2 * | 11/2010 | Stevenson | 200/50.24 |

* cited by examiner

*Primary Examiner* — Thiem Phan
(74) *Attorney, Agent, or Firm* — Buskop Law Group, PC; Wendy Buskop

(57) ABSTRACT

A portable electrical equipment racking tool with an onboard power supply, controllers and drive assembly that can raise or lower the drive assembly while operating the drive assembly from a safe distance form the electrical equipment needing replacement.

24 Claims, 7 Drawing Sheets

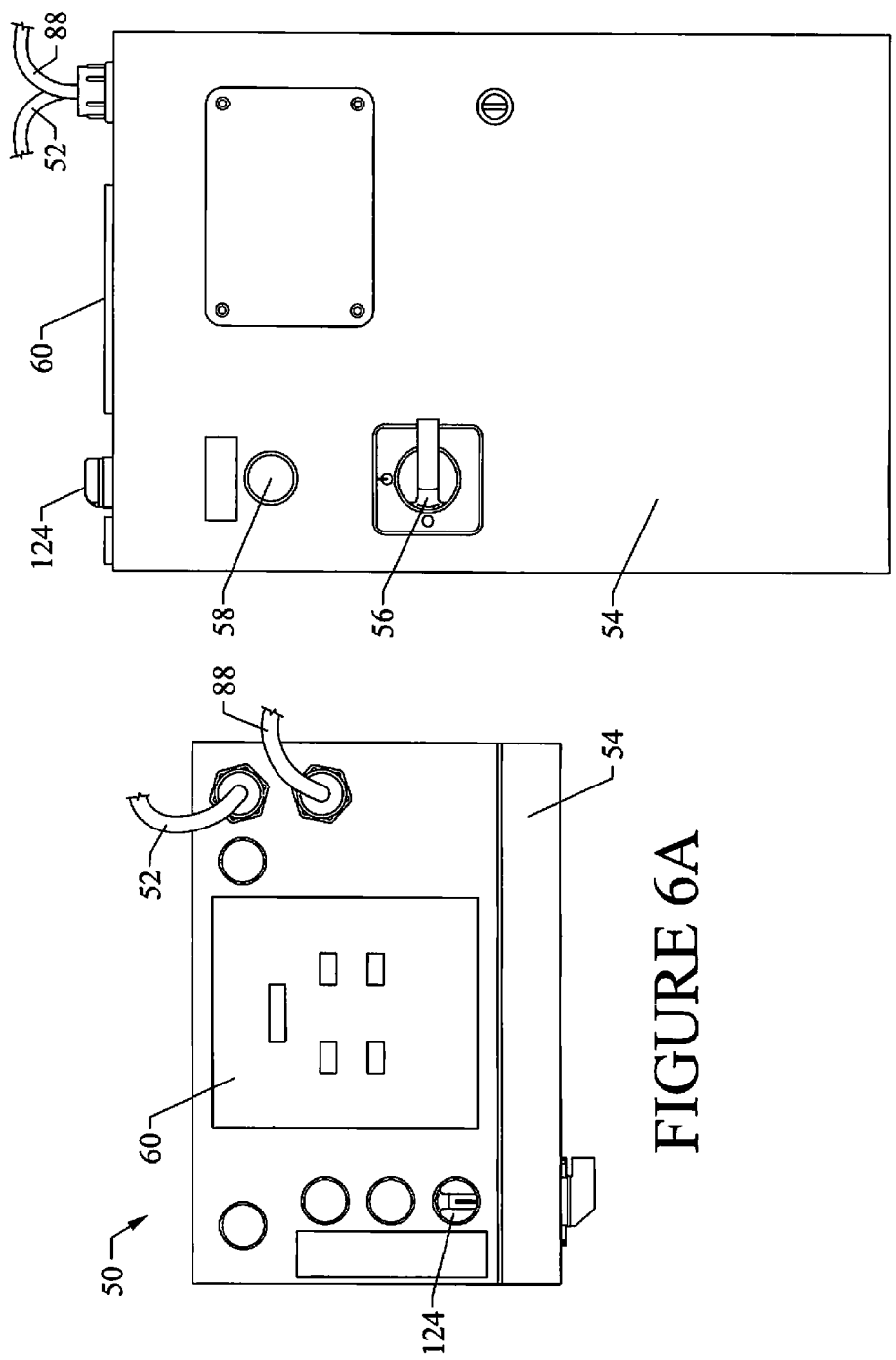

PORTABLE ELECTRICAL EQUIPMENT RACKING TOOL

CROSS-REFERENCE TO RELATED APPLICATIONS

The present application claims priority to and the benefit of U.S. Provisional Patent Application Ser. No. 61/084,897, filed Jul. 30, 2008, entitled "Circuit Breaker Replacement Tool" and is incorporated herein in its entirety.

FIELD

The present embodiments generally relate to a tool for automatically inserting and removing electrical devices, such as circuit breakers, from an electrical panel prone to arcing, such as from circuit breaker cells, using a remote control to keep a user distanced from possible arcing and safe from shock and burns.

BACKGROUND

Arc-flash is the result of a rapid release of energy due to an arcing fault between a phase bus bar and another phase bus bar, a neutral or a ground.

During an arc fault, air operates as the conductor. Air assists in creating an arc similar to an arc obtained during electric welding. The "arc fault" is typically manually started by a failure along the path of conduction, such as a breakdown in insulation.

The cause of the short often burns away during the initial flash. The "arc flash" can be sustained by the establishment of highly conductive plasma around the fault. In arc flash incidents, the majority of injuries and deaths occur from an explosion or burns.

The plasma from the arc flash will conduct as much energy as is available limited only by the impedance of the arc. This massive energy discharge burns the bus, vaporizes copper in the electrical device and causes an explosive volumetric increase. The "arc blast," conservatively estimated, has an expansion of 40,000 to 1. This fiery explosion devastates everything in its path creating deadly shrapnel as it dissipates and serious burns to any humans handling the equipment.

Several incidents have occurred in recent years which have resulted in injury and death due to these arc blasts.

The majority of these arc blast incidents occurred while a circuit breaker was being installed or removed from a circuit breaker cabinet. Since removing and installing circuit breakers requires a user to be in close proximity to switchgear being installed, and on some occasions, to be physically in the circuit breaker cabinet itself, it is a highly hazardous activity.

A need has long existed for a device that enables the installation or removal of electrical devices, such as circuit breakers, to be done with a remotely operated vehicle that can install or remove circuit breakers or similar types of electrical devices, from an electrical panel, such as a cell of circuit breakers or a circuit breaker cabinet.

A need has existed for a specialty installation tool designed for safety and reliability protecting a user from the deadly arc blast.

The present embodiments meet these safety and reliability needs, prevents death, destruction and explosions.

The embodiments of the invention can be used on existing switch gear and circuit breakers not designed for remote installation and removal.

BRIEF DESCRIPTION OF THE DRAWINGS

The detailed description will be better understood in conjunction with the accompanying drawings as follows:

FIG. 6A is a top view of the control assembly.

FIG. 6B is a front view of the control assembly.

DETAILED DESCRIPTION

Figure 1:
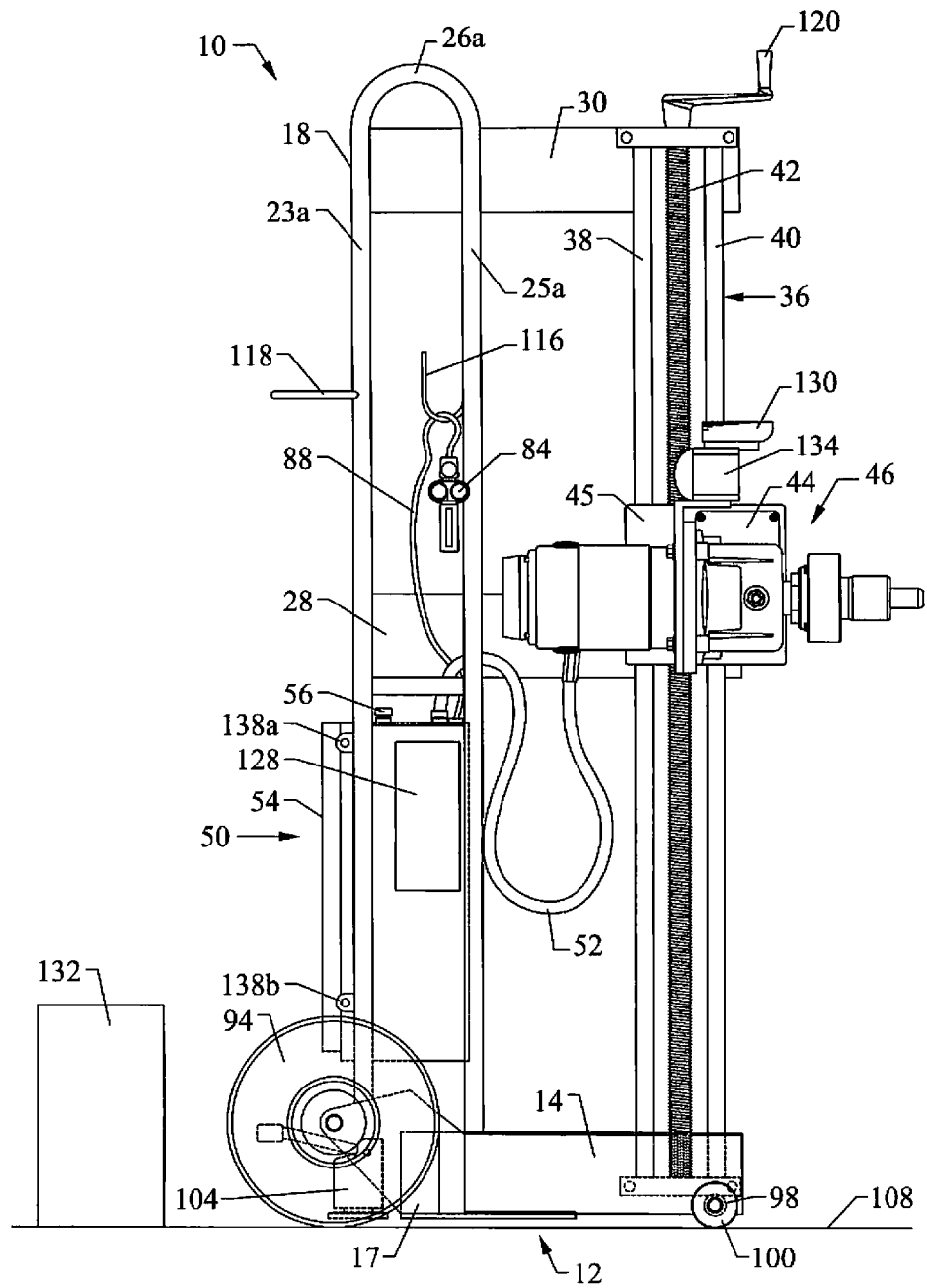
FIG. 1 is a is a left side view of an embodiment of the portable electrical device racking tool.

Before explaining the present apparatus in detail, it is to be understood that the apparatus is not limited to the particular embodiments and that it can be practiced or carried out in various ways.

An embodiment can include an electrical equipment racking tool adapted for remote operation using a one piece cart, which can be made from generally hollow steel tubular and steel plates or a rigid non-deforming material, such as polycarbonate. The cart can be moveable, portable and able to be dragged up stairs or down stairs, where the cart weighs generally less than 200 pounds.

The term "racking" as used herein, refers to the installing or removing of electrical equipment from a device, such as an electrical cabinet, or a circuit breaker cell, which can cause arcing. "Racking" involves the need to linearly move the electrical equipment completely from the housing or cabinet, enabling the circuit breaker cells or similar units to be serviced, cleaned, or repaired. "Racking" denotes the movement in and out. This tool and method can be used for remote robotic racking, instead of manual racking, which can be very dangerous.

The cart can have a base frame that can be a three part construction, having a first support that is a projecting steel arm connected at a 90 degree angle to a back support which is connected at a 90 degree angle to a second support that is a second projecting steel arm.

To this base frame, a first riser is connected, which can be made of a hollow tubular in an embodiment.

The first riser can have a first riser first leg connected by a rounded handle structure to a first riser second leg, forming a first side of the cart. Similarly, a second riser can be connected to the base frame with a similar second riser first leg connected by a rounded handle structure to a second riser second leg, forming a second side of the cart. The first side of the cart is opposite the second side of the cart.

The first riser has a first riser base and the rounded handle portion forms a first riser top. The first riser base portion connects to the base frame.

A first slide support is connected to the first riser at a point midway between the first riser base and the first riser top.

A second slide support extends from the first riser top.

At least four braces can be disposed between the first and second risers in a spaced apart relationship, of between about 6 inches to about 16 inches apart. The braces can be hollow tubes and have an inner diameter between about 0.25 inches to about 0.5 inches.

A load bearing wheel assembly can be connected to the base frame for transporting the cart and easily moving the cart around. The load bearing wheel assembly can be a load bearing axel with a first and second load bearing wheel.

A slide can be connected at a perpendicular angle to each of the first and second slide supports in an embodiment.

The slide, in an embodiment, can be a hollow one piece structure with a first external rail and a second external rail spaced about 1 inches to about 4 inches apart.

The external rails can be parallel to each other and can be perpendicular to the base frame.

Internal to the slide can be an actuatable internal lifting means, such as a threaded helical turning device, in an embodiment.

A slide table can be moveably connected on the rails and can support the actuatable lifting means, between the rails facing the drive assembly. The actuatable internal lifting means can be a helical screw mechanism.

The slide table can have a interlocking mechanism that engages with the actuatable lifting means, enabling the slide table to lift the drive assembly as a linear actuator using rotation to produce motion.

A motor mount can be positioned on the slide table enabling the drive assembly to project away from the cart for improved balance. The motor mount enables the drive assembly to be mounted at least about 3 inches to about 6 inches in front of the center of the slide table.

A control assembly can be used to operate the tool. The control assembly can have a motor connection cable for engaging the drive assembly and controlling the drive assembly.

The control assembly can have a housing with a closable door. The housing can be steel and can hold various electronics in the housing and support electronics mounted to the housing and the door.

In an embodiment, the control assembly can have an on/off switch, which can be mounted to the housing or door. In an embodiment, the control assembly can have a "power on" indicator mounted in the door and connected to internal electronics. This indicator can be a light that glows when the device is ready to operate, as a safety feature reminding the operator not to push the device or enable rotation improperly when the device is powered.

A current controller can be mounted in the top of the housing for easy access by a user, which can further be used for engaging a motor that can be a part of the drive assembly.

The housing and door can be hinged embodiment. Alternatively, the door can be secured to the housing with at least one fastener.

The door and housing can be powder coated with a material that reduces attracting static charge, which is an important safety feature.

The drive assembly, in addition to the motor, can have a clutch, a brake, and a gear box. The motor can be an AC/DC single speed motor. In another embodiment, it can be a variable speed electric motor. An example of a usable motor is a ⅓ hp, 3400 revolutions per minute, using 250 watts, motor made by Ningbo EMP DC Motor Dynamics Co T of China, such as model M4-7271508B. The drive assembly can include a brake connected to the motor, a gear box connected to the motor, and a clutch connected to the gear box that enables the motor to run in forward, neutral and reverse. The clutch can be a mechanical 50 foot pound clutch in an embodiment. Attached to the clutch can be a drive coupling. The drive couplings can be ones made by CBS ArcSafe, Inc. of Denton, Tex.

In the control assembly can be at least two run contactors one for running the motor in a clockwise rotation and the second run controller for running the motor in a counter-clockwise rotation, for installing or removing an electrical device, such as a circuit breaker.

The run in contactors can be in communication with the current controller. An example of a run in contactor can be one made by Telemecanique of France.

At least one battery can be used with DC voltage of up to about 24 volts and can provide electric power to the at least two run contactors. Two batteries can be used in series as well. The batteries can be small, such as about 6 inches by about 4 inches so they fit in the housing compact. The device is portable, with each part of the assembled tool, weighing no more than 50 pounds.

At least one AC/DC power supply with battery charger can be mounted to the housing and connected to at least one battery, or two batteries for charging when hooked up to an external AC power source that is not on-board the cart and in a wall socket or similar source. An example of a usable AC/DC power supply can be one made by Iota of the U.S.A. A small generator can also be used to charge the batteries of the control assembly.

A motor protection relay can be disposed between two run contactors and the drive assembly in the housing. The motor protection relay can be one made by Telemecanique.

In the control assembly can be an auxiliary power bus connected in parallel to the AC/DC power source. An example of an auxiliary power bus can be one such as a Phoenix Contact power bus from Germany. This configuration of the parallel connection allows either the power supply or the on-board battery to continue to power the drive assembly even if one of the power sources fails, such as the batteries run out of electricity.

A feature of the invention, is that the tool can be operated without being electrically connected to a wall outlet and the tool is portable and moveable without being plugged into a wall outlet.

Safety is an important feature of this invention, namely safety of the user from being burned by arc flashes. Accordingly, the invention requires a control that can be remote to the device, such as a pendant station.

The pendant station can have a pendant controller and a connecting cable connected to the current controller for operating the drive assembly. The drive assembly can rotate the drive coupling to rotate a tool for either installing or removing electrical equipment while an operator is remote to the cart.

An embodiment can contemplate that the load bearing wheel assembly has a load bearing axel that is held by the base frame.

The load bearing axel can rotate within the base frame. One side of the load bearing axel supports a first load bearing wheel, that can be made of rubber over a steel wheel, solid rubber, or pneumatic tires for providing improved insulation from arcing or shocking. The load bearing axel can support a second load bearing wheel opposite the first load bearing wheel. The wheels can be external to the first and second risers.

An embodiment can contemplate that the cart can have a front axel connecting and extending from the first and second supports of the base frame.

A first small diameter wheel can be secured to the front axel opposite the first load bearing wheel. A second small diameter wheel can be secured to front axel opposite the second load bearing wheel. The first and second small diameter wheels can be contemplated to be made by polyamide or a similar material that enables non-deforming when exposed to either heat or pressure and also is non-conducting of electricity. The load bearing wheels can have a diameter between about 6 inches to about 16 inches. The small wheels can be between about 3 inches to about 8 inches in diameter.

A first floor lock such as those made by Hammerlock, part number 909 LK-42SA can be bolted or welded to the back support of the base frame. A similar second floor lock can be connected to the back support for removably and lockingly engaging the base frame with a surface, such as a concrete floor. The floor locks hold the device to the floor so the cart does not slide around during use. An embodiment contemplates using suction cup floor locks.

The pendant station, which can be made by Techno Elettrica Ravasi of Italy can have an emergency stop, a clockwise rotation actuator and a counter clockwise rotation actuator enabling remote actuation of the electrical equipment racking tool.

The connecting cable connecting the pendant station to the housing can have a retractile cord that when retracted is about 9 feet long, and when extended, can be up to about 25 feet in length.

The cart can have at least one hook for supporting the connecting cable and other items. The at least one hook can be secured by fasteners or welded to at least one brace.

A solid shaped rod of about 0.25 inches in diameter steel forms a protective hoop extending from riser to riser preventing impact by foreign objects with the housing.

This protective hoop extends from the first riser to the second riser and provides a load bearing non-deforming barrier between the risers and the surface and prevents fragile parts of the cart from breaking.

Turning now to the slide, the drive assembly can be moved up and down the rails of the slide with a hand operated crank or an electric gear motor that turns the helical screw.

Another embodiment can contemplate that the drive assembly is orientable at an angle between about 50 degrees to about 90 degrees from the base frame.

In the control assembly, an automatic shut off can be used with a preset amperage limit for turning off the drive assembly when the preset amperage limit is exceeded. An embodiment can contemplate the clutch being used in conjunction with the current controller and the automatic shut off, enable this device to be very safe, and reliable and not have motor burn out due to excessive temperatures, or forces.

Another embodiment can contemplate that the pendant station can be wirelessly connected to the drive assembly using a wireless transmitter disposed on the pendant station and a wireless receiver connected to the current control module and mounted to the cart.

Regarding the specific end use with circuit breakers, the electrical equipment racking tool can be adapted for use with circuit breakers having a voltage less than about 38,500 volts AC.

Another embodiment can contemplate that the entire cart can be 100 percent extruded aluminum channel or 100 percent chrome steel molybdenum tubing to make the cart light and strong. When the tubing is hollow, the cart can weigh less than about 200 pounds.

A different embodiment can contemplate that a wireless video camera can be mounted to a camera bracket which in turn can be mounted to the drive assembly. The wireless video camera can communicate with a remote video receiver enabling handheld monitoring of signals from the camera. The handheld remote video receiver can be one made by Sony or by Insignia.

At least one light, such as a light emitting diode "LED" or a halogen spotlight can be connected to the auxiliary power bus and mounted to the cart. The light, run by the batteries or AC/DC power supply can illuminate targets. An LED light is usable herein because it is explosion proof and rugged, such as those made by Magnalight.

A stair climber assembly can be contemplated for use in transporting the cart up and down stairs. The stair climber assembly has at least four mounting tabs, each with a hole in the center. At least two mounting tabs are welded to each riser. The tabs can be about 0.3 inches thick and can be made from steel. The hole diameter can be about 0.3 inch in diameter in an embodiment.

A stair climbing bracket can be secured to each mounting tab. A hand truck brace can be attached to two of the stair climbing brackets. Two hand truck braces can be used on each cart Each hand truck brace can have at least one sliding side allowing the tool to slide easily across stairs. Usable hand truck braces can be ones that are made by Liberator of Minnesota.

In another embodiment, the slide can be a two stage high lift mast wherein the mast has two segments that each can have a length between about 4.5 feet to about 8 feet. The two stage mast can elevate the drive assembly at least about 3 inches to about 4 feet above the risers and at least about 90 inches.

The two stage high lift mast can have in an embodiment, a mast base frame connected to the first support above the front axel. The two stage high lift mast has a fixed mast segment connected to the mast base frame which in turn is fixedly mounted to the first support and the first and second moveable slide supports.

The first and second moveable locking brackets, such as those made by Bosch of Germany, can be adjusted up and down the slide. The second movable locking bracket engages the fixed mast segment in a spaced apart relationship from the first moveable locking bracket.

Additionally, the two stage high lift mast can have a moving slide segment for slidably engaging the fixed slide segment.

A lifting means, such as a threaded helical rod, can be used for raising and lowering the drive assembly along the moving slide segment. It can be contemplated that a gear motor can be secured to the moving slide segment for raising and lowering the drive assembly by raising or lowering the moving slide segment. The gear motor can be electrically connected to the power supply on board the cart.

A motor control can be secured to the cart for operating the gear motor. The motor control can be electrically connected to the auxiliary power bus and have an on/off switch. The motor control can be one made by Oriental Motor of China. The motor speed can be adjusted depending need of the user. The motor can be a 50 watt motor.

The invention can also include a method for installing and/or removing electrical equipment and a method for racking electrical equipment.

As a first step, the method can contemplate positioning the electrical equipment racking tool adapted for remote operation near a piece of electrical equipment. The electrical equipment racking tool is very versatile, as it can host many different sizes of electrical equipment couplings enabling removing at one side using one tool of various sizes of electrical equipment needing racking. For example, a hospital can have a circuit breaker room with circuit breakers of one size for the AC and a second size for lighting in the operating rooms. This tool allows the hospital to rack all sizes of electrical devices.

As a second step, the method involves aligning the drive assembly with the electrical equipment needing racking.

The tool can then be raised, lowering, moved left, or moved right so that the drive assembly is properly aligned with the electrical equipment's racking mechanism.

Next, a connecting/disconnecting tool is attached to the drive coupling of the racking tool.

As a subsequent step, the racking tool is engaged with the electrical equipment racking mechanism.

A user then operates the drive assembly of the racking tool with the pendant station to rotate the drive coupling until the electrical equipment is fully installed or fully removed. The pendant station is operated a safe distance from the electrical equipment racking tool such as 9 feet away or more or less, depending on the type of electrical equipment needing racking.

It can be contemplated that the electrical equipment needing racking can be a circuit breaker, a load break switch, a non-load break switch, motor contactors, high voltage distribution interrupters, switches or sectionalizers.

An embodiment of the invention can include a circuit breaker racking tool which can handle circuit breakers of medium voltage. Medium voltage is construed to mean a voltage slightly less than about 2,500 volts, and to up to about 28,000 volts.

The invention can also be used to remove and install high voltage circuit breakers which operate in voltages exceeding about 28,000 volts. A high voltage circuit breaker for Europe use can be 245,000 volts. The invention can also be used to install or remove low voltage circuit breakers, wherein the voltage of the low voltage circuit breakers is less than the voltage of the medium voltage circuit breaker, such as between about 480 volts to about 2,400 volts.

The circuit breaker racking tool embodiment has the cart with a base frame, two risers, at least two wheels, at least one brake, floor locks and is easy to move by one person who is not strong. The cart's risers have a slide attached to them for supporting a drive assembly. The slide enables the drive assembly for the circuit breaker racking tool to be adjustable to different vertical heights using a crank along a slide, or an electric motor.

In an embodiment the cart be made from powder coated steel. The base frame can be perforated to reduce the overall weight of the cart.

The cart can be made of tubular steel, coated such as with a paint, to reduce ionic or static charges or "arcing" that is, reducing the possibility of the formation of arcs between the tool and an electric circuit breaker to be replaced.

Hollow tubes, rather than solid rods, provide the benefit of enabling the cart to be low weight, such as less than 200 pounds overall, and ease of movement around a plant floor, providing greater versatility.

Each side of the cart can be connected by at least two horizontally oriented braces which can be made up of a stiff steel plate that is also coated, or square tubes, or a similar metal. In an embodiment, plastic braces can be contemplated to reduce static charge build up and thus reduce the possibility of explosions. Rods can be used as braces.

Up to 5 braces can be used in parallel above the back support between the risers.

Each riser is designed to ensure a strong, rigid cart, able to support the weight of a drive assembly without deformation such as 40 pounds of gear.

In an embodiment, each brace can be from about 4 inches to about 8 inches long, from about 2 inches to about 4 inches wide and from about ⅛ inch to about ½ inch thick. The brace can have holes drilled on each end to engage a fastener extending through the tubular for a secure engagement with the riser. Other fastening means can also be contemplated herein such as welding.

A slide can be disposed between the risers of the cart and secured to extensions from one of the risers. The slide can be a solid structure, made of metal or a polymeric pipe. The slide can be non-deformable material and resistant to static charge build up. The slide can be made of a material that resists deformation in the presence of high temperatures. The slide can have at least two rails.

The slide on one end, can connect to the base frame. The slide can be connected to the base frame at an angle from about 80 degrees to about 100 degrees. The slide can be welded to the base frame or otherwise fastened in a non-removable fashion, such as with rivets.

A crank be can attached to the slide on the end opposite the base frame. The crank can rotate a lifting means is parallel along the slide from top to bottom. The lifting means can be a rod with a helical thread patterns enabling a drive assembly to move along the slide away from the base frame, or back to the base frame, if already at another position.

In one embodiment, the crank can have an "L" shaped extension, enabling the cranking to occur while facing the cart instead of having to reach around to the top of the slide and crank to rotate the rod. The rod can be made of about ⅛ inch to about ½ inch diameter solid steel, polypropylene, polypropylene/polyethylene homopolymers or copolymers, or even made from strong graphite composite materials, or even steel reinforced polymers.

The drive assembly can be secured to the slide so that it can be moved from a first position adjacent the base frame to a second position anywhere along the slide above the base frame allowing tremendous versatility of use, without the need for a user to touch the drive assembly.

The slide can be operated by the use of an electric motor that connects to the onboard power, such as the batteries. For example the crank can be replaced with a motor which can selectively rotate the lifting means connected to the slide.

The drive assembly can be hinged to the cart, enabling the drive assembly to be orientable or "tiltable" from about 50 degrees to about 90 degrees from the plane of the base frame.

In an embodiment, the wheels can be made with solid rubber tires over metal hubs. The rubber tires can be natural rubber, synthetic rubber or steel reinforced tires. In an embodiment the tires can be air-filled tires.

The drive assembly can be a motor that can be battery operated.

The battery can provide at least 24 volts to the motor.

The motor can be a variable drive motor such as an Electric Motor Power EMP brand model m4-7271508B motor. The battery can be a 24 volt DC battery consisting of two 12 volt DC lead-acid batteries.

The motor can be operated by a remote control device that can be powered by the power supply running the motor. The power supply running the motor can be a fuel cell or other device, lead-acid battery, or a lithium ion battery so long as the power supply is not too heavy enabling the tool to remain portable.

The power supply can be integrated with the cart so there are no loose wires to trip an operator or to conduct a charge of electricity to another source or user in case of shorting or arcing.

The amount of torque applied to the motor of the drive assembly can be limited, by the use of a mechanical clutch.

The drive assembly can be used to limit torque applied to the circuit breaker while racking.

It is contemplated that the automatic shutoff can also engage a brake for slowing the motor while simultaneously shutting of power to the motor in a different embodiment.

In an embodiment, the remote control can be wirelessly connected to the drive assembly.

In an embodiment, the cart can be an extruded aluminum support frame, a molybdenum steel frame, or a non-deformable polymeric cart.

The controls for the rotary drive assembly are contained in a pendant-style hand control with a long cable, such as a 25 foot cable allowing a user to be clear from potential dangers that exist when there is a failure.

The circuit breaker racking tool can replace an operator using a hand tool. An electronic device on this circuit breaker racking tool can continuously measure the current draw of the system, automatically shutting down the unit when a settable trip point is reached, which is also referred to herein as a preset limit. The torque can be mechanically limited via a slip clutch inline with the motor of the drive assembly.

Turning now to the Figures, FIG. 1 is a left side view of the portable electrical device racking tool.

FIG. 1 shows a one piece cart 10 with a base frame 12.

Figure 2:
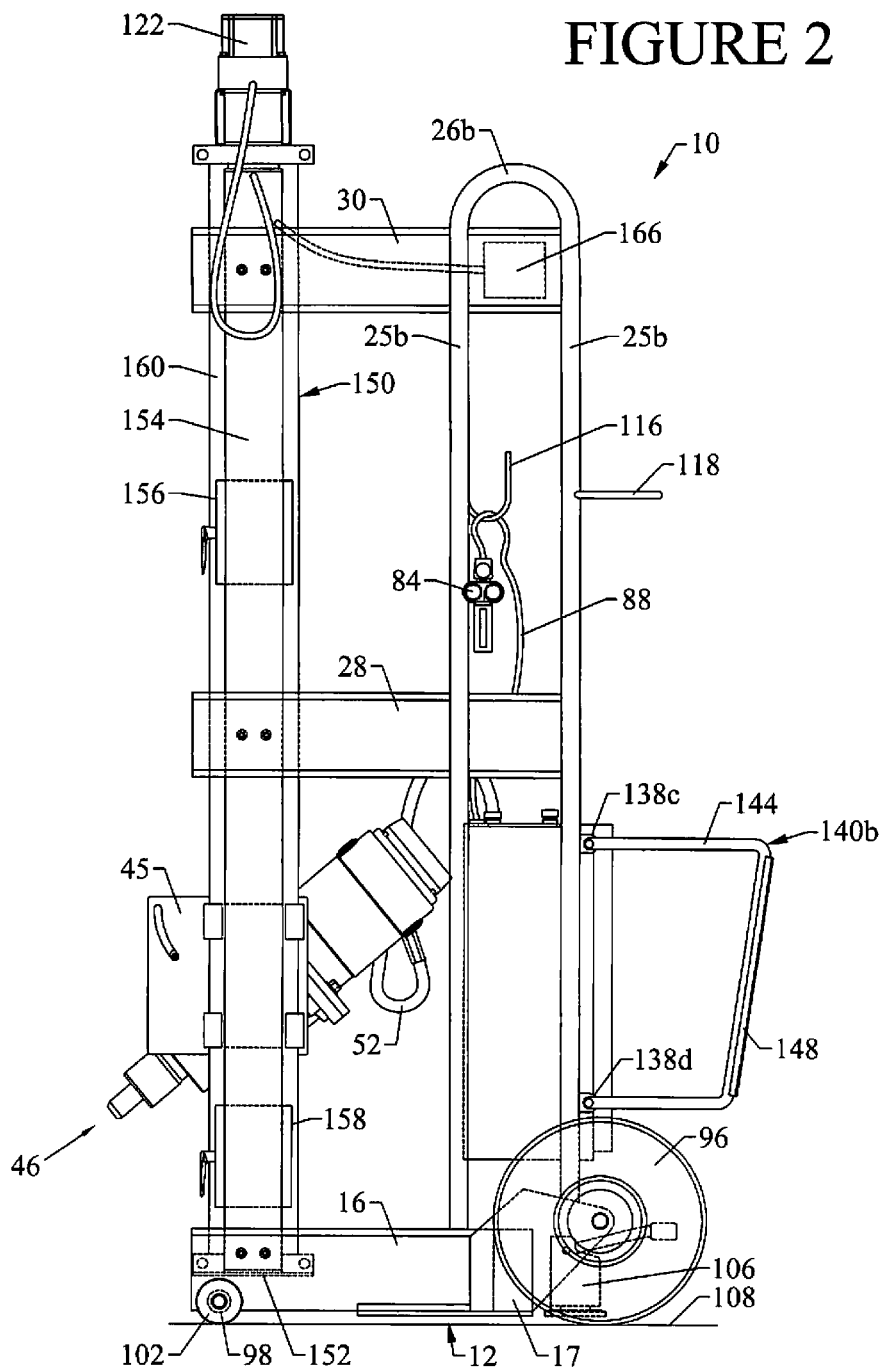
FIG. 2 is a is a right side view of an embodiment of the portable electrical device racking tool.

The one piece cart 10 can have a first riser 18 and a second riser 21, shown in FIG. 2.

FIG. 1 shows the first riser 18, which can be a U-shaped tubular construction having a first riser first leg 23a and first riser second leg 25a connected by a first rounded handle 26a.

The base frame 12 can have a first support 14 parallel to a second support 16, also shown in FIG. 2. The first and second supports can be connected by a back support 17.

Figure 3:
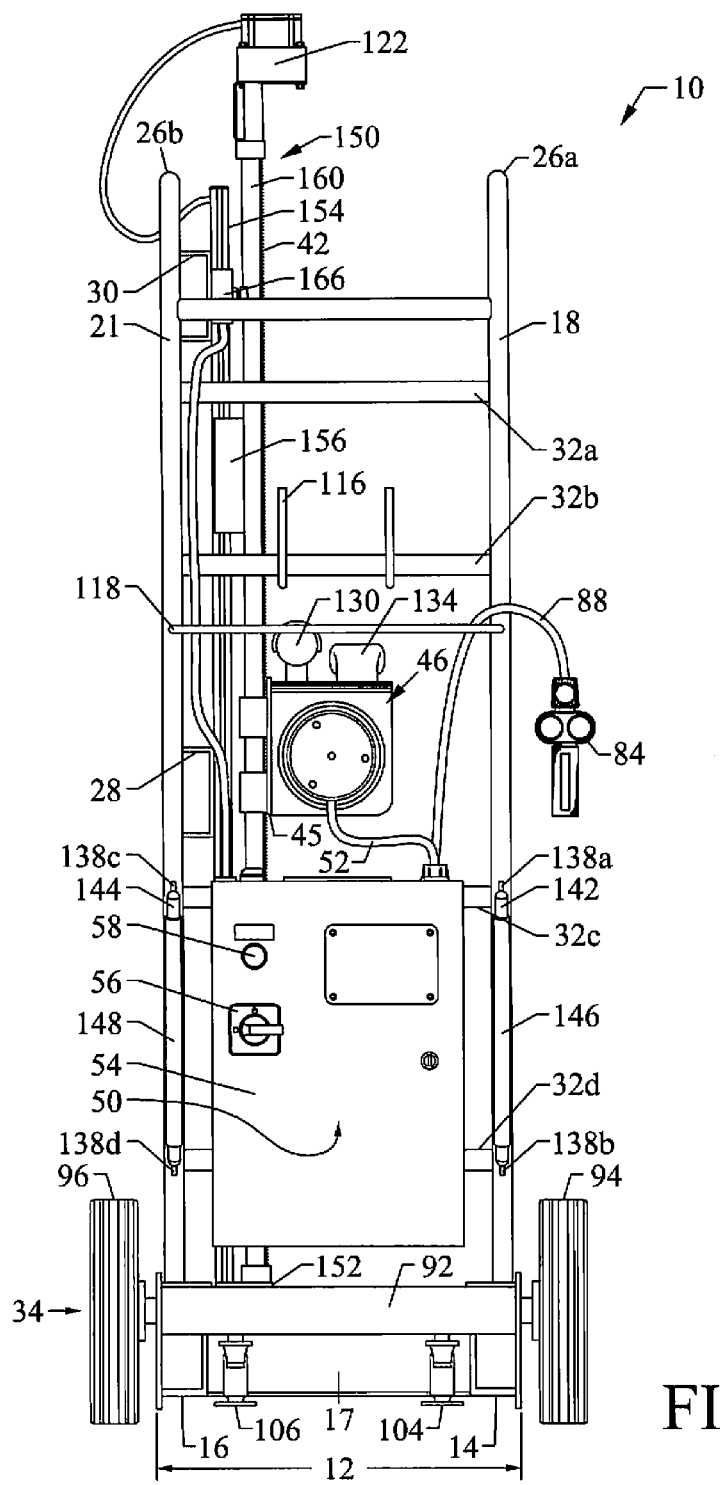
FIG. 3 is a rear view of an embodiment of the portable electrical device racking tool.

FIG. 1 shows a first load bearing wheel 94 which can be part of a load bearing wheel assembly 34, which is shown in FIG. 3. A first small diameter wheel 100 is also shown connected to a front axel 98 in FIG. 1. The wheels can allow the one piece cart to be rolled on a surface 108.

A first floor lock 104 is shown in FIG. 1. The first floor lock can be used to prevent the one piece cart 10 from rolling on the surface 108 once in position to install or remove a electrical equipment such as a circuit breaker.

In this view, a first slide support 28 and a second slide support 30 can be seen. In this embodiment, the first and second slide can support a one piece slide 36.

The one piece slide 36 can have a first external rail 38, a second external rail 40 and a actuatable internal lifting means 42. The actuatable internal lifting means 42 can be a helical threaded rod that can be cranked by a crank 120 or by an electric motor 122, which is shown in FIG. 2.

A slide table 45 is shown in FIG. 1. The slide table 45 can be moved up and down along the first external rail 38 and second external rail 40 by cranking the actuatable internal lifting means 42 with the crank 120 or the electric motor 122.

A drive assembly 46 can be attached to the slide table 45 by use of a motor mount 44.

A video camera 130 and light 134 can also be attached to the slide table 45. The video camera can be hard wired into a control assembly 50, or it can be wireless. It is contemplated that the video camera can also transmit a feed wirelessly to a remote video receiver 132 so that the video can be viewed at a safe distance from the arc zone. on/off switch 56, power on indicator 58 and a closable door 54

A pendant station 84 can be connected to the control assembly 50 by means of connecting cable 88. The drive assembly 46 can also be connected to the control assembly 50 via the motor connection cable 52. It is contemplated that the pendant station 84 can be used to control the actions of the drive assembly 46 and that the connecting cable 88 can be long enough to ensure that a technician can operate the portable electrical device racking tool at a safe distance from the electrical device.

It is contemplated that the pendant station 84 can communicate wirelessly with out the need for connecting cable 88. A wireless transmitter 126 can be disposed on the pendant station 84 and a wireless receiver 128 can be connected to the current controller 60, which can be seen in FIG. 6A, and mounted to the one piece cart 10.

In FIG. 1, the control assembly 50 is shown with a on/off switch 56 and a closable door 54. The control assembly 50 is shown in more detail in FIGS. 6A and 6B.

FIG. 1 also shows a storage hook 116 that can be used to hold the connecting cable 88 or other gadgets needed in use.

A protective hoop 118 can extend from the first riser to the second riser and can provide a load bearing non deforming barrier between the risers and the surface.

Mounting tabs 138a and 138b are shown in FIG. 1. The mounting tabs can be used to mount a stair climbing bracket 140a, which is shown in FIG. 3, with a first hand truck brace 142 and first sliding side 146.

FIG. 2 is a right side view of the portable electrical device racking tool.

FIG. 2 shows the one piece cart 10 with the base frame 12. The one piece cart 10 can have a first riser 18, as shown in FIG. 1, and a second riser 21.

FIG. 2 shows the second riser 21, which can be a U-shaped tubular construction having a second riser first leg 23b and second riser second leg 25b connected by a second rounded handle 26b.

The base frame 12 can have a first support 14 parallel to a second support 16. The first and second supports can be connected by a back support 17.

FIG. 2 shows a second load bearing wheel 96 which can be part of a load bearing wheel assembly 34, which is shown in FIG. 3. A second small diameter wheel 102 is also shown connected to a front axel 98 in FIG. 2. The wheels can allow the one piece cart to be rolled on a surface 108.

A second floor lock 106 is shown in FIG. 2. The second floor lock can be used to prevent the one piece cart 10 from rolling on the surface 108 once in position to install or remove electrical equipment such as a circuit breaker.

In this view, a first slide support 28 and a second slide support 30 can be seen. In this embodiment, the first and second slide can support a two stage high lift mast 150 with a fixed mast segment 154 and a moving slide segment 160.

The fixed mast segment 154 can be attached to a mast base plate 152 which can in turn be connected to the second support 16 above the front axel 98.

In the embodiment depicted in FIG. 2, an electric motor 122 can be used to move the slide table 45, and motor assembly 46 attached thereon, up and down along the moving slide segment 160 by cranking the actuatable internal lifting means 42, hidden from view in this embodiment, but shown in FIG. 3.

A first moveable locking bracket 156 and a second moveable locking bracket 158 can slidably engage the fixed mast segment 154 for sliding the moving slide segment 160 up and down the fixed mast segment 154. The first moveable locking bracket 156 and second moveable locking bracket 158 can be locked into place at any point along the fixed mast segment 154.

FIG. 2 shows motor control 166 for controlling the electric motor 122.

A pendant station 84 can be connected to the control assembly by means of connecting cable 88. The drive assembly 46 can also be connected to the control assembly via the motor connection cable 52.

It can be contemplated that the pendant station 84 can be used to control the actions of the drive assembly 46 and that the connecting cable 88 can be long enough to ensure that a technician can operate the portable electrical device racking tool at a safe distance from the electrical device.

Mounting tabs 138c and 138d are shown in FIG. 2. A stair climbing bracket 140b with a second hand truck brace 144 and second sliding side 148 is shown mounted to the mounting tabs.

FIG. 2 also shows storage hook 116 that can be used to hold the connecting cable 88 or other gadgets needed in use.

Protective hoop 118 can extend from the first riser to the second riser and can provide a load bearing non deforming barrier between the risers and the surface 108.

FIG. 3 is a rear view of the portable electrical device racking tool.

FIG. 3 shows the one piece cart 10 with base frame 12, first riser 18 and second riser 21. Braces 32a, 32b, 32c and 32d are shown connected between first riser 18 and second riser 21. Braces 32a, 32b, 32c and 32d can provide strength and support for the one piece cart and can provide attachment areas for items such as storage hook 116 and control assembly 50.

The base frame 12 can have a first support 14 parallel to a second support 16. The first and second supports can be connected by a back support 17.

FIG. 3 shows load bearing wheel assembly 34 with first load bearing wheel 94, second load bearing wheeling 96 and load bearing axel 94.

First floor lock 104 and second floor lock 106 are shown in FIG. 3. The floor locks can be used to prevent the one piece cart 10 from rolling on the surface 108 once in position to install or remove a electrical equipment such as a circuit breaker.

In this view, a first slide support 28 and a second slide support 30 can be seen. In this embodiment, the first and second slide can support a two stage high lift mast 150 with a fixed mast segment 154 and a moving slide segment 160.

The fixed mast segment 154 can be attached to a mast base plate 152 which can in turn be connected to the second support 16 above the front axel 98.

In the embodiment depicted in FIG. 3, an electric motor 122 can be used to move the slide table 45, and motor assembly 46 attached thereon, up and down along the moving slide segment 160 by cranking the actuatable internal lifting means 42.

A first moveable locking bracket 156 and a second moveable locking bracket 158, shown in FIG. 2, can slidably engage the fixed mast segment 154 for sliding the moving slide segment 160 up and down along the fixed mast segment 154. The first moveable locking bracket 156 and second moveable locking bracket 158 can be locked into place at any point along the fixed mast segment 154.

FIG. 3 shows motor control 166 for controlling the electric motor 122.

Pendant station 84 can be connected to the control assembly by means of connecting cable 88. The drive assembly 46 can also be connected to the control assembly via the motor connection cable 52.

It can be contemplated that the pendant station 84 can be used to control the actions of the drive assembly 46 and that the connecting cable 88 can be long enough to ensure that a technician can operate the portable electrical device racking tool at a safe distance from the electrical device.

In FIG. 3, the control assembly 50 is shown with a on/off switch 56, power on indicator 58 and a closable door 54. The control assembly 50 is shown in more detail in FIGS. 6A and 6B.

Mounting tabs 138a, 138b, 138c and 138d are shown in FIG. 3. Stair climbing brackets 140a and 140b with first and second hand truck braces 142 and 144 and first and second sliding sides 146 and 148 can be seen mounted to the mounting tabs.

FIG. 3 also shows storage hook 116 that can be used to hold the connecting cable 88 or other gadgets needed in use.

Protective hoop 118 is shown extending from the first riser to the second riser and can provide a load bearing non deforming barrier between the risers and the surface 108.

Video camera 130 and light 134 can also be seen in FIG. 3. The video camera can be hard wired into a control assembly 50, or it can be wireless. It is contemplated that the video camera can also transmit a feed wirelessly to a remote video receiver 132 so that the video can be viewed at a safe distance from the arc zone. A wireless transmitter 126 and a wireless receiver can also be used to receive and send information to the video camera 132.

Figure 4:
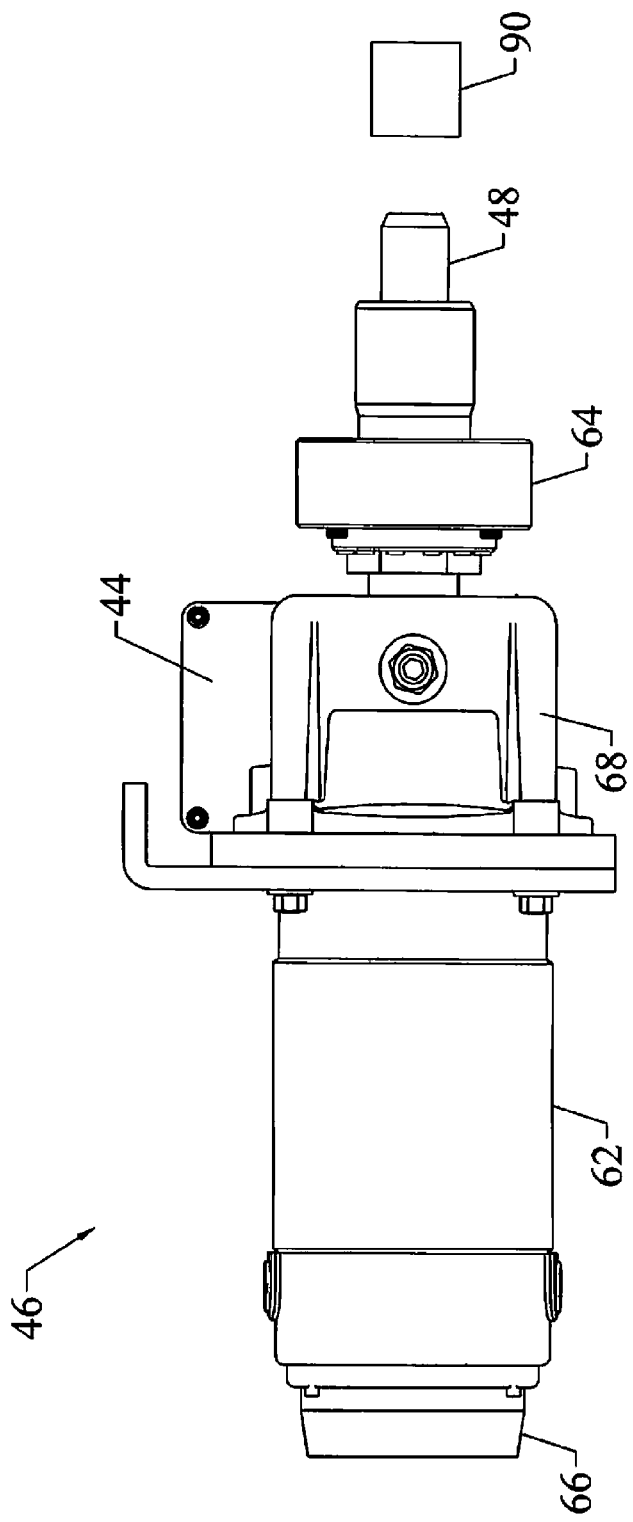
FIG. 4 is a side view of the drive assembly.

FIG. 4 is a side view of the drive assembly 46.

The drive assembly 46 can have a drive assembly motor 62, a clutch 64, a brake 66 and a gear assembly 68, a drive coupling 48 and a connecting/disconnecting tool 90.

Motor mount 44, which can be used to connect the drive assembly 46 to the slide table 45, shown in FIG. 1, can also be seen in FIG. 4.

Figure 5A:
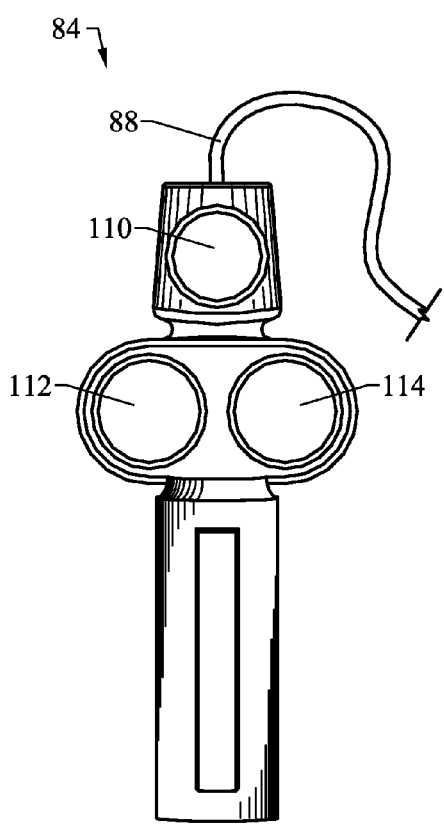
FIG. 5A is a front view of an embodiment of the pendant station.

FIG. 5A provides a more detailed view of the pendant station 84 which can be connected to the control assembly 50 by the connecting cable 88. The pendant station can have at least three buttons, an emergency stop 110, a clockwise rotation actuator 112, and a counterclockwise rotation actuator 114.

Figure 5B:
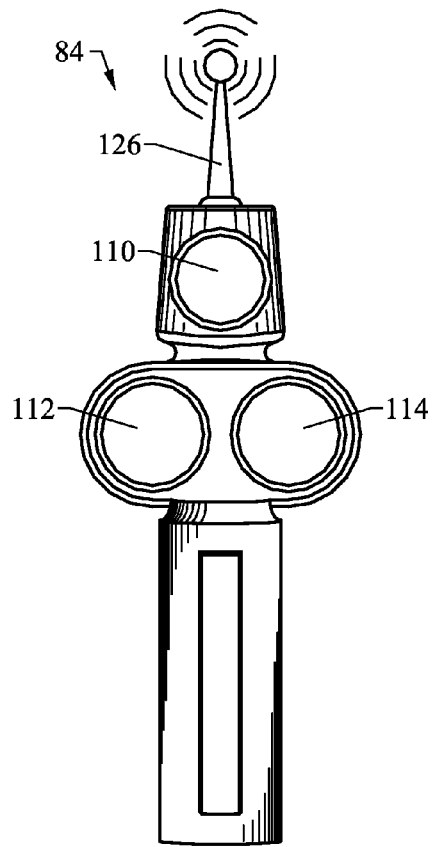
FIG. 5B is a front view of an another embodiment of the pendant station.

FIG. 5B depicts and alternate embodiment of the pendant station 84 which can have a wireless transmitter 126 disposed on it. The wireless transmitter 126 can be in communication with the wireless receiver 128, shown in FIG. 1, mounted to the one piece cart 10.

FIG. 6A depicts a top view of an embodiment of the control assembly 50 with a current controller 60. The current controller 60 can be used to control the drive assembly 46, shown in FIG. 1.

Also shown in FIG. 6A is an automatic shut off 124. The automatic shut off can be used to shut down power and any action to all parts of the of the portable electrical device racking tool in case of emergency.

Both the motor connection cable 52 and the connecting cable 88 can be seen connected to the control assembly 50 in FIG. 6A.

FIG. 6B depicts a front view of an embodiment of the control assembly 50. Current controller 60, automatic shut off 124, motor connection cable 52 and connecting cable 88 can all be seen in this view.

In this embodiment, the on/off switch 56 and power on indicator 58 are oriented on the closable door 54 of the control assembly 50.

Figure 7:
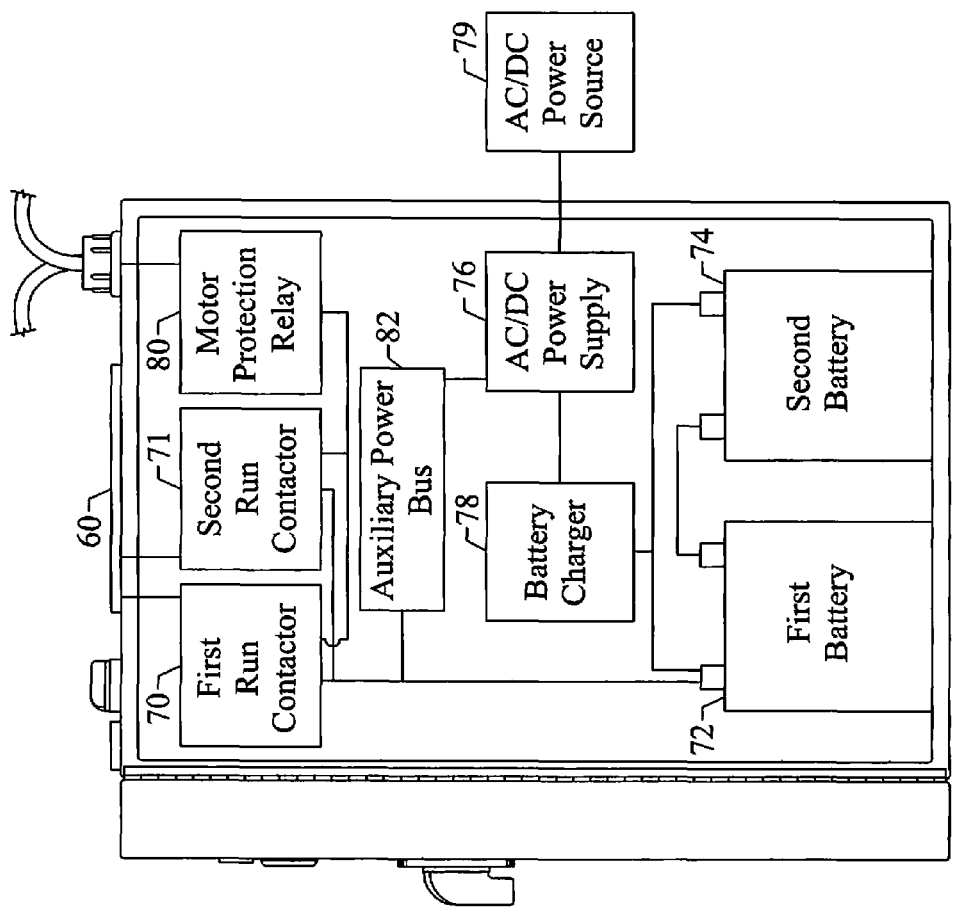
FIG. 7 is an interior view of the control assembly.

FIG. 7 is a view of the interior of the control assembly 50. The control assembly 50 can have a current controller 60 for engaging a drive assembly motor 62. A first run contactor 70 and a second run contactor 71 can be in communication with the current controller 60.

A first battery 72 and a second battery 74 can provide power to the first run contactor 70 and second run contactor 71.

An AC/DC power supply 76 with a battery charger 78 can be connected to the first battery 72 and second battery 74.

A motor protection relay 80 can be disposed between the at first run contactor 70 and second run contactor 71 and the drive assembly;

An auxiliary power bus 82 can be connected in parallel to an AC/DC power source allowing either the power supply 76 or the first battery 72 and second battery 74 to power the drive assembly.

An embodiment of the circuit breaker racking tool can be a modular, small footprint version that can be used in the holds of ships, and provides ease of replacement parts.

While these embodiments have been described with emphasis on the embodiments, it should be understood that within the scope of the appended claims, the embodiments might be practiced other than as specifically described herein.

What is claimed is:

1. An electrical equipment racking tool adapted for remote operation, comprising:
    a. a one piece cart comprising
        (i) a base frame comprising a first support and a second support connected to a back support;
        (ii) a first riser connected to the first support, wherein the first riser has a first riser bottom and a first riser top;
        (iii) a second riser connected to the second support opposite the first riser;
        (iv) a first slide support connected to the first riser midway between the first riser bottom and the first riser top;
        (v) a second slide support connected to the first riser and extending from the first riser top; and
        (vi) at least four braces engaging the first riser with the second riser;
    b. a first load bearing first wheel and a second load bearing second wheel connected to a load bearing axel pivotably mounted to the base frame for rolling the cart along a surface;
    c. a slide connected perpendicularly to each of the first and second slide supports, wherein the slide further comprises a first external rails and a second external rail, wherein the slide supports a slide table moveably connected to the first and second external rails, and an actuatable internal lifting means mounted internally in the slide;
    d. a drive assembly with a drive coupling mounted to the slide table;
    e. a control assembly mounted on the cart, wherein the control assembly comprises:
        (i) a motor connection cable for engaging the drive assembly from the control assembly;
        (ii) a housing having a closeable door, wherein the housing supports:
            (a) an on/off switch;
            (b) a power on indicator;
            (c) a current controller for engaging a drive assembly motor;
            (d) at least two run contactors in communication with the current controller;
            (e) at least one battery providing power to the at least two run contactors;
            (f) at least one AC/DC power supply with battery charger connected to the at least one battery and for engaging an AC power source;
            (g) a motor protection relay disposed between the at least two run contactors and the drive assembly;
            (h) an auxiliary power bus connected in parallel to the AC/DC power source allowing either the power supply or the battery to continue to power the drive assembly;
            (i) a pendant station comprising a pendant controller and a connecting cable connected to the current controller for operating the drive assembly, wherein the drive assembly rotates a drive coupling to rotates a connecting/disconnecting tool for installing or removing electrical equipment while an operator is remote to the cart.

2. The electrical equipment racking tool of claim 1, wherein the drive assembly with motor further comprises a clutch and a brake connected to a gear assembly.

3. The electrical equipment racking tool of claim 2, further comprising an front axel disposed between the first and second supports connecting and extending from the first and second support, wherein a first small wheel is secured to the front axel opposite the first load bearing wheel and a second small wheel is secured to front axel opposite the second load bearing wheel.

4. The electrical equipment racking tool of claim 3, wherein the slide comprises a two stage high lift mast to elevate the drive assembly and provided extended height above the risers.

5. The electrical equipment racking tool of claim 4, wherein the two stage high lift mast comprises:
    a. a mast base plate connected to the first support above the front axel;
    b. a fixed mast segment connected to the mast base plate fixedly mounted to the first support and the first and second slide supports;
    c. a first moveable locking bracket slidably engaging the fixed mast segment, and a second movable locking bracket slidable engaging the fixed mast segment in a spaced apart relationship from the first moveable locking bracket;
    d. a moving slide segment for slidingly engaging the first and second moveable locking brackets;
    e. a lifting means for raising and lowering the drive assembly along the moving slide segment;
    f. a gear motor secured to the moving slide segment for raising and lowering the drive assembly and electrically connected to the power supply; and
    g. a motor control secured to the cart for operating the gear motor and electrically connected to the auxiliary power bus.

6. The electrical equipment racking tool of claim 1, further comprising a first floor lock connected to the back support and a second floor lock connected to the back support for removably and lockingly engaging the base frame with the surface.

7. The electrical equipment racking tool of claim 1, wherein the pendant station comprises a emergency stop, a clockwise rotation actuator and a counter clockwise rotation actuator for remote actuation of the electrical equipment racking tool.

8. The electrical equipment racking tool of claim 1, wherein the cable is a retractile cord.

9. The electrical equipment racking tool of claim 8, wherein the retractile cord is between 3 feet to 25 feet.

10. The electrical equipment racking tool of claim 1, comprising at least one storage hook connected to one of the braces for supporting at least the connecting cable.

11. The electrical equipment racking tool of claim 1, further comprising a protective hoop extending from the first riser to the second riser and providing a load bearing non deforming barrier between the risers and the surface.

12. The electrical equipment racking tool of claim 1, wherein the slide is operable by a crank or an electric gear motor.

13. The electrical equipment racking tool of claim 1, wherein the drive assembly is orientable at an angle between 50 degrees to 90 degrees from the base frame.

14. The electrical equipment racking tool of claim 1, further comprising an automatic shut off switch comprising a preset amperage limit for turning off the drive assembly when the preset amperage limit is exceeded.

15. The electrical equipment racking tool of claim 1, wherein the load bearing wheels have a diameter between 6 inches to 16 inches.

16. The electrical equipment racking tool of claim 3, wherein the first and second small wheels have a diameter between 3 inches to 8 inches and wherein the small wheels have a diameter less than the load bearing wheels.

17. The electrical equipment racking tool of claim 1, wherein the pendant station is wirelessly connected to the drive assembly using a wireless transmitter disposed on the pendant station and a wireless receiver connected to the current controller and mounted to the cart.

18. The electrical equipment racking tool of claim 1, wherein the tool is adapted for use with circuit breakers having a voltage less than 38,500 volts AC.

19. The electrical equipment racking tool of claim 1, wherein the cart comprises a member of the group: chrome steel molybdenum tubing or an extruded aluminum channel.

20. The electrical equipment racking tool of claim 1, wherein the risers comprise hollow tubing.

21. The electrical equipment racking tool of claim 1, further comprising a wireless video camera is mounted to the drive assembly and connected to a remote video receiver enabling handheld monitoring of signals from the wireless video camera.

22. The electrical equipment racking tool of claim 1, further comprising at least one light connected to the auxiliary power bus and mounted to the cart for illuminating a target for the camera.

23. The electrical equipment racking tool of claim 22, wherein the light is an explosion proof rugged light emitting diode "LED" light.

24. The electrical equipment racking tool of claim 1, further comprising:
 a. at least two mounting tabs mounted to each riser on a riser leg in parallel with the back support;
 b. a stair climbing bracket removably attachable to each mounting tab;
 c. a hand truck brace removably attachable to two stair climbing brackets, wherein each hand truck brace has a sliding side allowing the tool to slide easily across stairs.

* * * * *